(12) United States Patent
Heinz et al.

(10) Patent No.: US 7,404,264 B2
(45) Date of Patent: Jul. 29, 2008

(54) METHOD AND DEVICE FOR TREATING SEAT COVERS FOR TRANSPORT VEHICLES

(75) Inventors: Engelbert Heinz, Vlotho (DE); Wilfried Dreischmeier, Vlotho (DE); Henry Wurm, Roeschwoog (FR)

(73) Assignee: Johnson Controls GmbH, Burscheid (DE)

( * ) Notice: Subject to any disclaimer, the term of this patent is extended or adjusted under 35 U.S.C. 154(b) by 779 days.

(21) Appl. No.: 10/480,913

(22) PCT Filed: Jun. 13, 2002

(86) PCT No.: PCT/EP02/06493

§ 371 (c)(1),
(2), (4) Date: Dec. 15, 2003

(87) PCT Pub. No.: WO02/103101

PCT Pub. Date: Dec. 27, 2002

(65) Prior Publication Data

US 2004/0200092 A1    Oct. 14, 2004

(30) Foreign Application Priority Data

Jun. 15, 2001    (DE) .............................. 101 28 662

(51) Int. Cl.
*D06F 58/12* (2006.01)
*F26B 21/00* (2006.01)

(52) U.S. Cl. .................. 38/7; 34/558; 68/5 C

(58) Field of Classification Search ............ 38/1 R, 38/2, 3, 7, 8, 9, 14, 1 A; 223/51, 52; 8/147, 8/150; 4/524; 68/5 C, 5 D; 34/558
See application file for complete search history.

(56) References Cited

U.S. PATENT DOCUMENTS

| | | | | |
|---|---|---|---|---|
| 2,990,088 A | * | 6/1961 | Isken et al. | 223/76 |
| 3,319,849 A | * | 5/1967 | Horberg, Jr. | 223/76 |
| 3,357,611 A | * | 12/1967 | Berger et al. | 223/76 |
| 3,644,085 A | * | 2/1972 | Beeley et al. | 8/150 |
| 3,765,580 A | * | 10/1973 | Wilsker et al. | 223/52 |
| 4,761,305 A | * | 8/1988 | Ochiai | 427/180 |
| 5,516,012 A | * | 5/1996 | Weigel | 223/51 |
| 6,311,526 B1 | * | 11/2001 | Frushtick | 68/5 C |
| 6,405,461 B1 | | 6/2002 | Groel et al. | |
| 6,615,419 B1 | * | 9/2003 | Chang | 4/524 |

FOREIGN PATENT DOCUMENTS

| | | |
|---|---|---|
| DE | 31 19 560 A1 | 12/1982 |
| JP | 59-28992 | 2/1984 |
| JP | 59-32492 | 2/1984 |

* cited by examiner

*Primary Examiner*—Ismael Izaguirre
(74) *Attorney, Agent, or Firm*—Foley & Lardner LLP

(57) ABSTRACT

The invention relates to covers for seats used in transport vehicles, especially motor vehicles. The covers of the seats are automatically finished as the manufactured seats are transported by a conveyor through at least one treating chamber of a tunnel finisher. All of the seats are treated in the treating chamber at least with steam which smoothes the covers thereof. The inventive finishing treatment results in an even smoothness of said covers, even in areas which are difficult to reach manually.

14 Claims, 6 Drawing Sheets

METHOD AND DEVICE FOR TREATING SEAT COVERS FOR TRANSPORT VEHICLES

Figure 1:
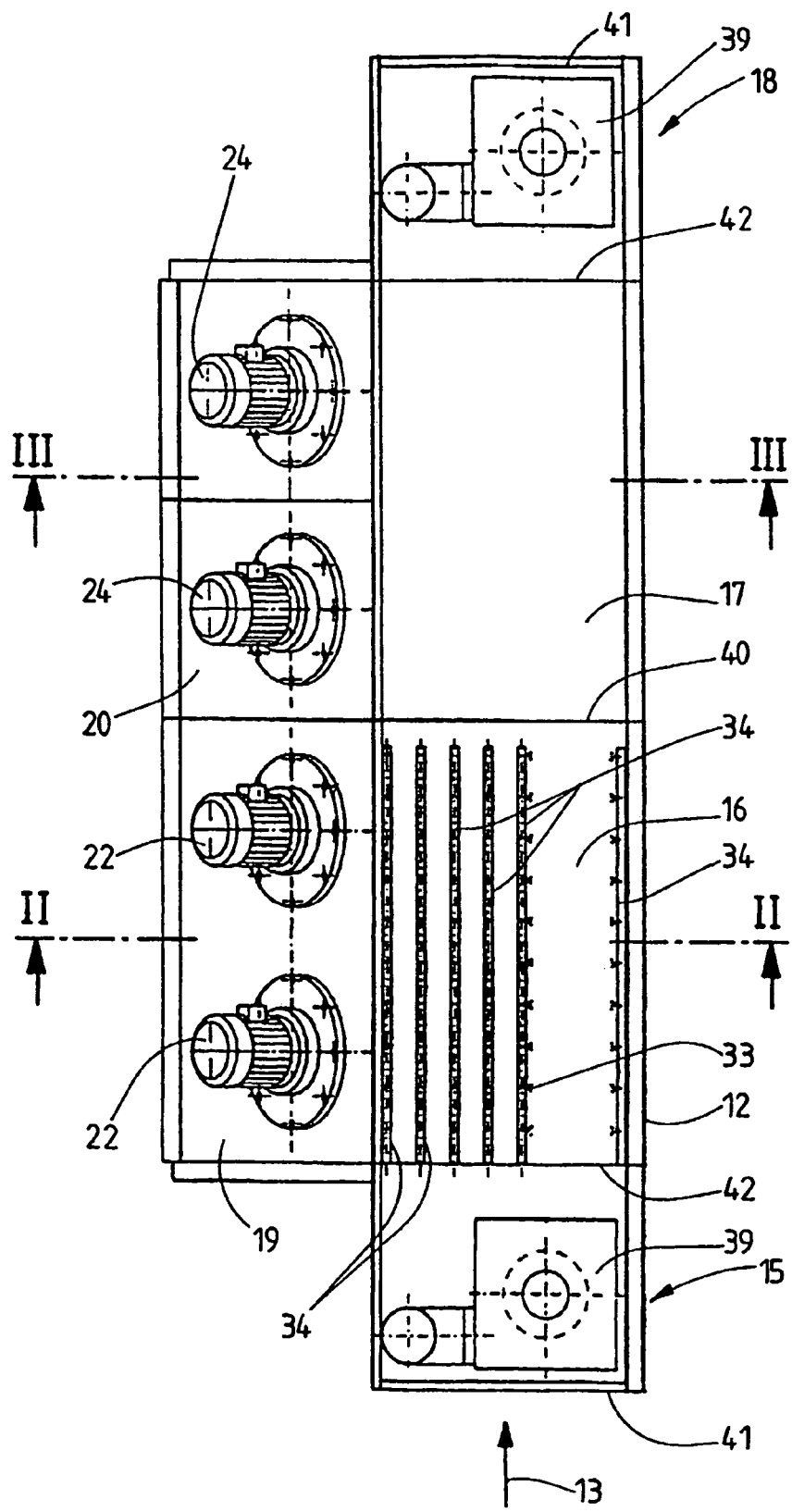

The invention relates to a method of treating seat covers for transport vehicles. Furthermore, the invention relates to a corresponding device.

In seats for transport vehicles, such as in particular passenger cars, goods vehicles, railroad vehicles, aircraft or the like, the covers are subjected to what are known as finishing treatments after being fitted to the seats. In this case, the covers are smoothed in particular with steam. This has hitherto been carried out manually after the cover has been drawn onto the frame of the seat. In the process, a hand-guided steam nozzle is moved over the surfaces of the seat cover by an operator. Apart from the manual effort associated with this, areas of the surface of the cover necessarily have steam applied to them with different intensities. Points on the surfaces of the cover which are difficult to reach are treated less and, in extreme cases, even not at all. The consequence is nonuniform smoothing of the cover. In extreme cases, it is even possible that some points on the cover are exposed to the steam for too long and therefore damaged.

Taking this as a starting point, the invention is based on the object of providing a method and a device with which seat covers for transport vehicles are treated automatically in a manner which meets the requirements, in particular uniformly.

In a method for achieving the object, the finished seats with covers drawn onto their frame are treated in at least one treatment chamber by using a treatment chamber makes it possible to expose the seats as a whole to the steam used for the treatment. As a result, uniform finishing treatment of the covers is ensured automatically, that is to say without manual intervention. The steam distributed in the treatment chamber can get uniformly to all points of the cover on the seat. In addition, the steam in the treatment chamber can be metered specifically, so that damage to the covers as a result of excessive steam treatment virtually cannot occur.

According to a preferred configuration of the method, the entire, completely assembled seats are subjected to the finishing treatment, that is to say with their frame and possibly with a substructure. This makes it possible to position the seats specifically on a conveyor, which transports them through the single treatment chamber or else through a plurality of treatment chambers. On account of the specific positioning on the conveyor, the seats can be finished in the treatment chamber in an exactly previously determinable position. The exact position of the seats in the treatment chamber makes it possible to position steam nozzles or the like specifically in the treatment chamber; to be specific, coordinated with the relative position of the seats with which they pass through the treatment chamber. As a result, it is ensured that the steam nozzles are at the correct distance from the covers and supply all the points on the same with steam or the like.

The seats are preferably transported through the respective treatment chamber oriented transversely. This makes it possible to form inlet and outlet openings for the seats into the treatment chamber and out of the treatment chamber to be as small as possible, since the cross-sectional area of the seats is possibly smaller than their rear surface.

Expediently, in at least one treatment chamber, the finished assembled seats are treated both with steam and with air, in particular hot recirculated air. In this case, the hot air preferably has a higher temperature than the steam. This leads to extremely fine distribution of the steam in the treatment chamber, which ensures particularly uniform treatment of all the areas of the covers, to be specific even areas which are difficult to reach manually.

In terms of the method, provision is further made to dry the finished seats in at least one treatment chamber. Such drying in a closed chamber can be carried out particularly quickly and reliably so that, when they leave the drying chamber, the seats are completely dry, to be specific including the frame that passes through the treatment chamber with it and, possibly, a substructure of the respective seat. This reliably avoids residual moisture remaining on or in the seats, which could lead to corrosion or the like. Alternatively, it is also conceivable to carry out the drying of the finished seats outside a treatment chamber.

A discharge of the air and/or of the steam from the treatment chamber is preferably carried out above a conveyor for transporting the seats through the relevant treatment chamber. As a result, the conveyor remains substantially dry, as a result of which the latter does not drag any moisture out of the treatment chamber or does not introduce cold liquid when it moves again into the treatment chamber used for the steam treatment. Alternatively or additionally, it is also possible to discharge steam and possibly also air from the relevant treatment chamber above the seats. As a result, the steam, normally aimed at the cover above the conveyor, cannot get to the conveyor and condense here.

A device for achieving the object mentioned at the beginning has at least one treatment chamber, to which steam and/or air can be supplied, and a conveyor that runs through the treatment chamber, the finishing treatment can be carried out automatically, by the seats in the treatment chamber having applied to them at least the steam used for smoothing and by the conveyor not just guiding the seats through the treatment chamber; instead, moving the seats into specific positions in the respective treatment chamber. By means of an appropriate conveyor speed, the residence time of the seats in the respective treatment chamber, and therefore the intensity of the treatment, can be matched to the requirements, in particular the materials of the covers.

According to a preferred refinement of the device, each treatment chamber is constructed in such a way that entire seats with their subframe can be transported through the respective treatment chamber by the conveyor. To this end, the conveyor is preferably provided with a seat carrier, on which the seats with their substructure are arranged to be transported through the respective treatment chamber. The seats with their substructure are preferably fixed detachably to the seat carrier. The seat carriers are arranged following one another at a distance at or on the conveyor, each seat carrier preferably being constructed to accommodate a (single) complete seat. By means of this configuration of the conveyor, it is readily possible to connect the seats to the seat carrier in order to transport them through the respective treatment chamber. Since the substructure of the seats has fastening means in any case, which are used for the subsequent fastening of the seats in the transport vehicle, these fastening means can be used for the detachable connection to the seat carrier, for which purpose the seat carrier is constructed in a manner corresponding to the fastening means on the substructure of the seat. As a result of fastening the seats to the conveyor, to be specific in particular on seat carriers, the seats are always given the same position on the conveyor, so that they can be transported through the respective treatment chamber in a specific relative position. As a result of arranging a single seat on each seat carrier, and the seat carriers following one another at a distance, it is ensured that either only a single seat is located in the respective treatment chamber or the seats in the respective treatment chamber are at such a distance from one another that steam and possibly air or recirculated air can get to the seats on all sides, and therefore uniform treatment of the covers is possible. However, it is also conceivable to construct the seat carriers in such a way that a plurality of seats, in particular an entire seat group, for example from a passenger car, has space on said seat carrier.

The device preferably has at least one treatment space for treating the covers with steam and, if appropriate, hot air or recirculated air, and at least one further treatment space for drying the treated seats. However, it is also conceivable to provide a plurality of treatment spaces both for steam treatment and for drying. The treatment spaces for the steam treatment and for the drying are preferably separated from one another by a dividing wall having a passage opening for at least the seats. As a result, there can always be steam in that treatment space in which the steam treatment takes place, while in the following treatment space for drying the treated seats, a climate needed for the drying always prevails. In this way, continuous steam treatment and drying of successive seats, which are transported through the device by the conveyor, preferably continuously, is possible.

According to a preferred development of the device, the inlet openings for conveying the seats into the first treatment chamber and/or the outlet opening for conveying the treated seats out of the last treatment chamber are constructed in the manner of airlocks. This ensures that the steam and/or the air remain in the treatment chambers and do not get outside. A vacuum is preferably produced in the airlock-like regions of the inlet opening and/or the outlet opening. This leads to an air curtain in the regions of the inlet opening and/or of the outlet opening which are constructed in the manner of airlocks which, at least for the major part, prevents any exchange of the ambient air with the air in the respective treatment chamber. As a result, the inlet openings and/or the outlet openings do not need to have any mechanical closures, such as doors. The inlet openings and/or outlet openings can always remain open for the unimpeded inward transport of seats into the device and preferably also for transporting the treated seats out of the device.

Figure 2:
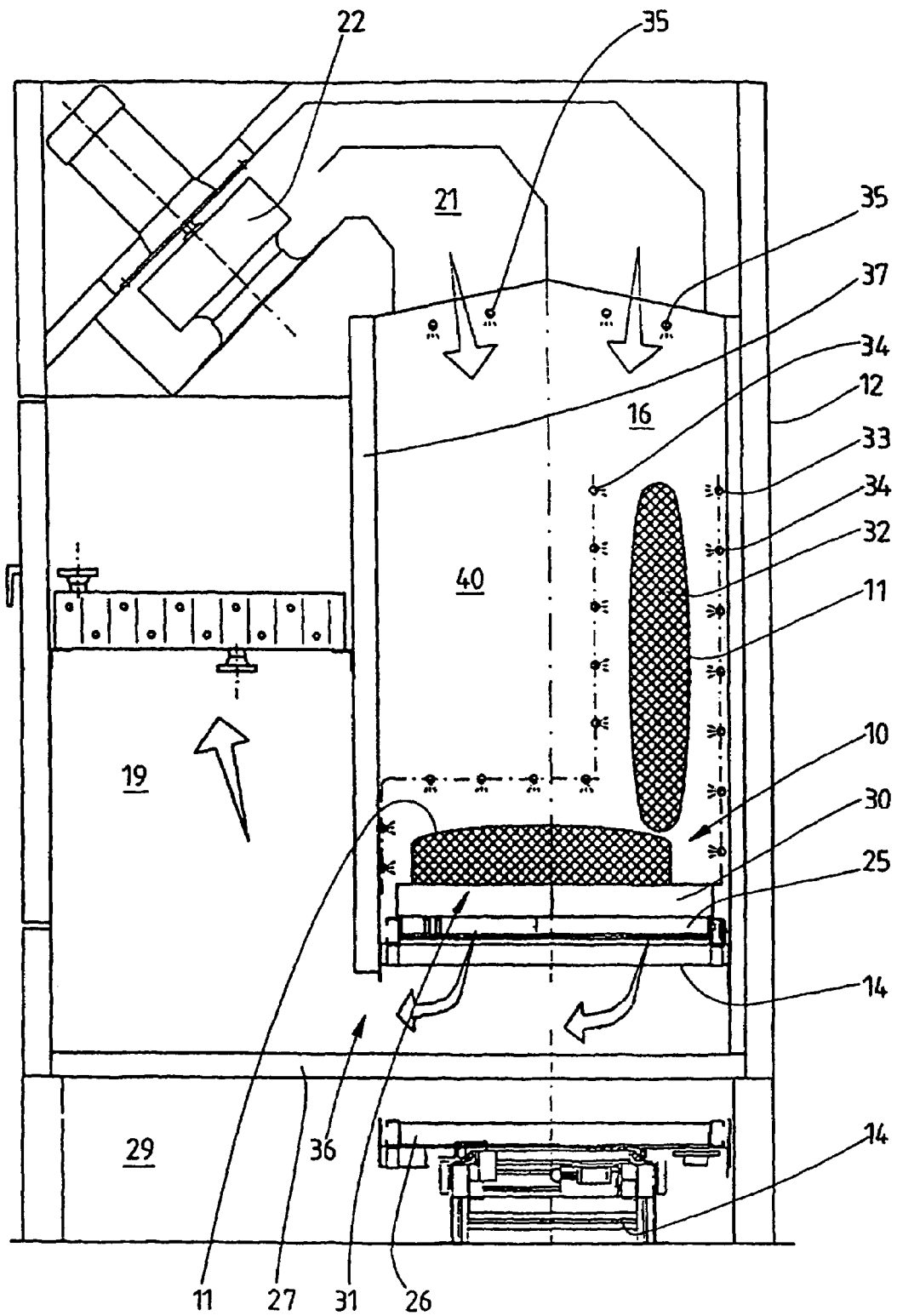
Figure 3:
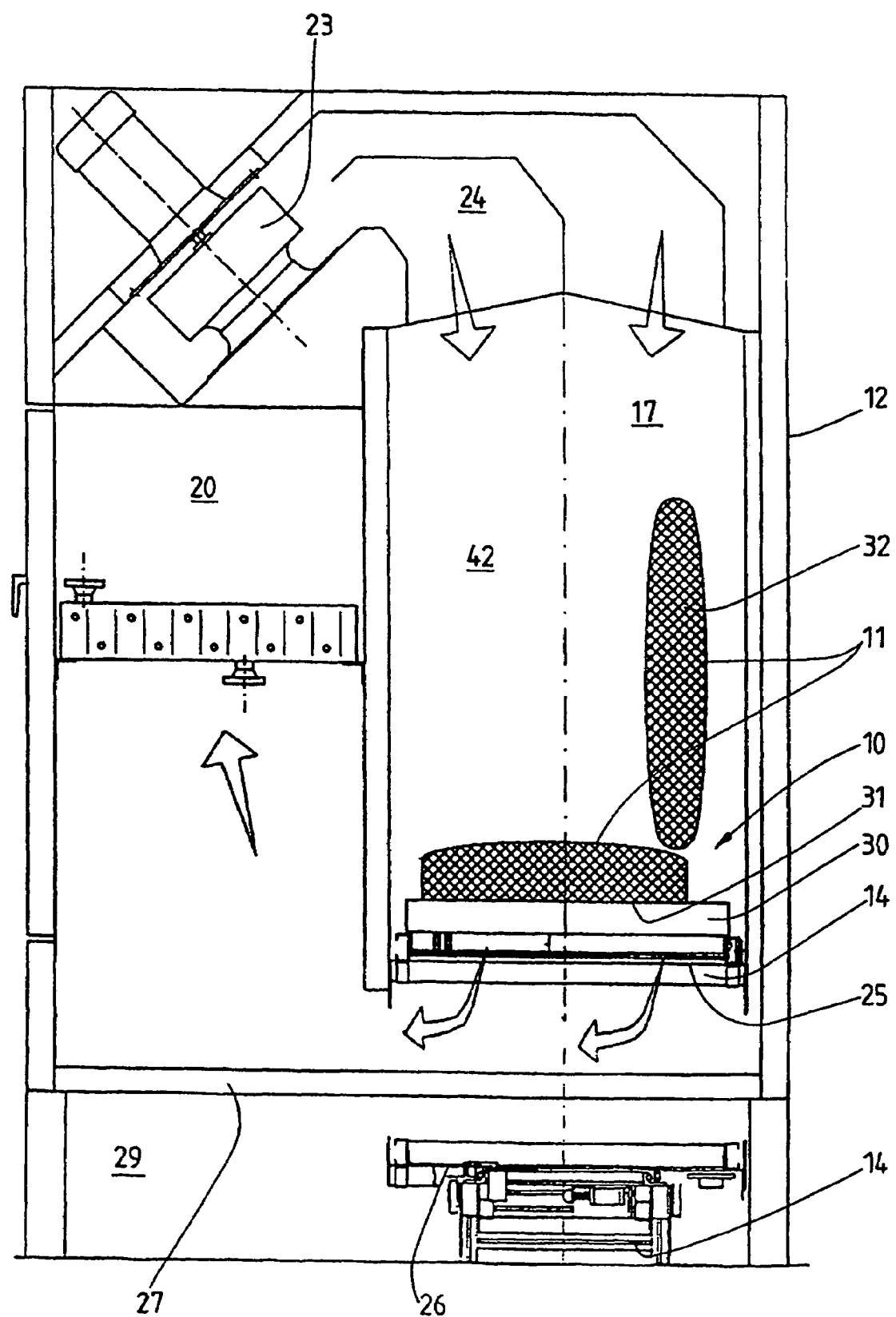
Figure 4:
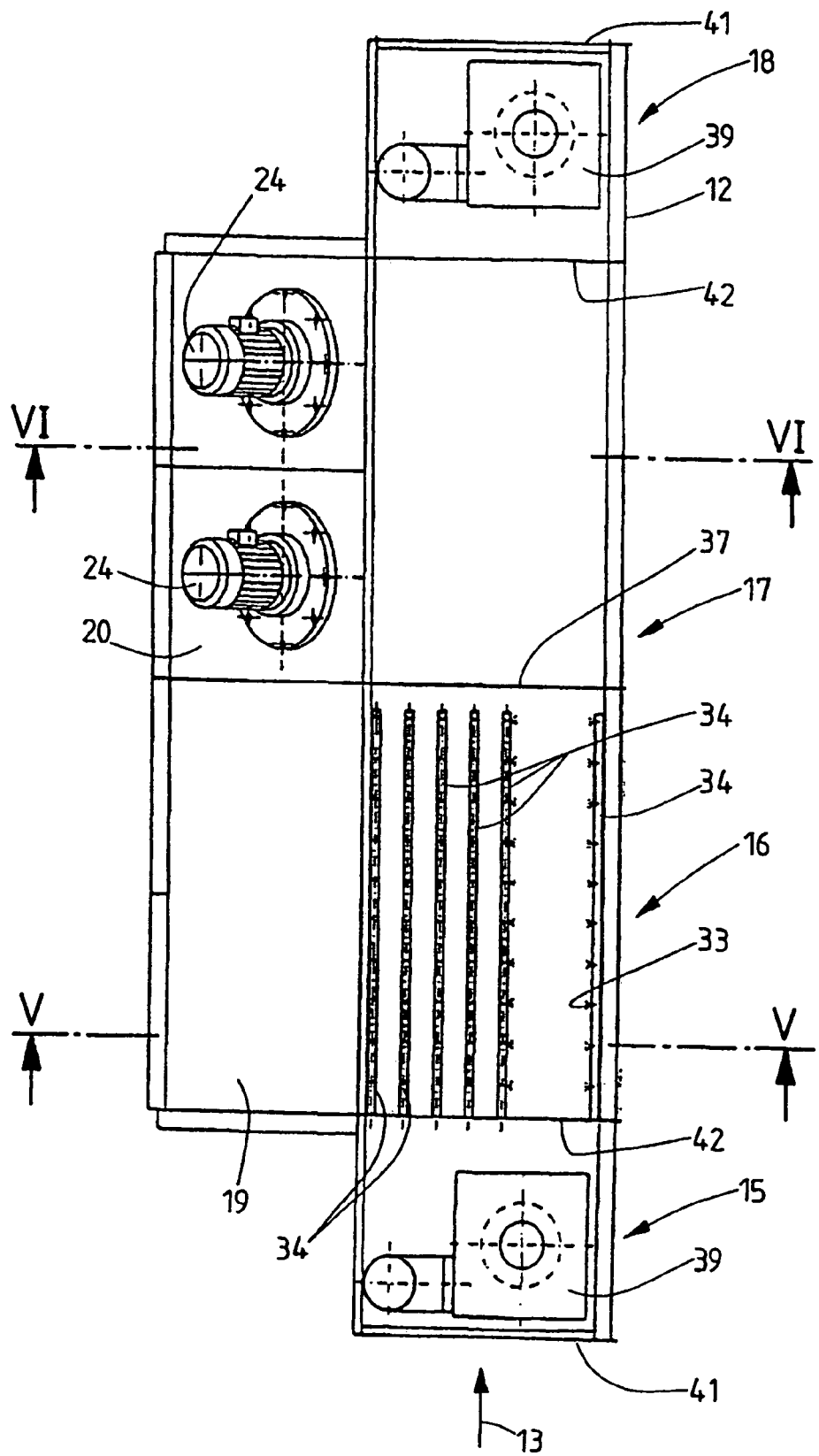
Figure 5:
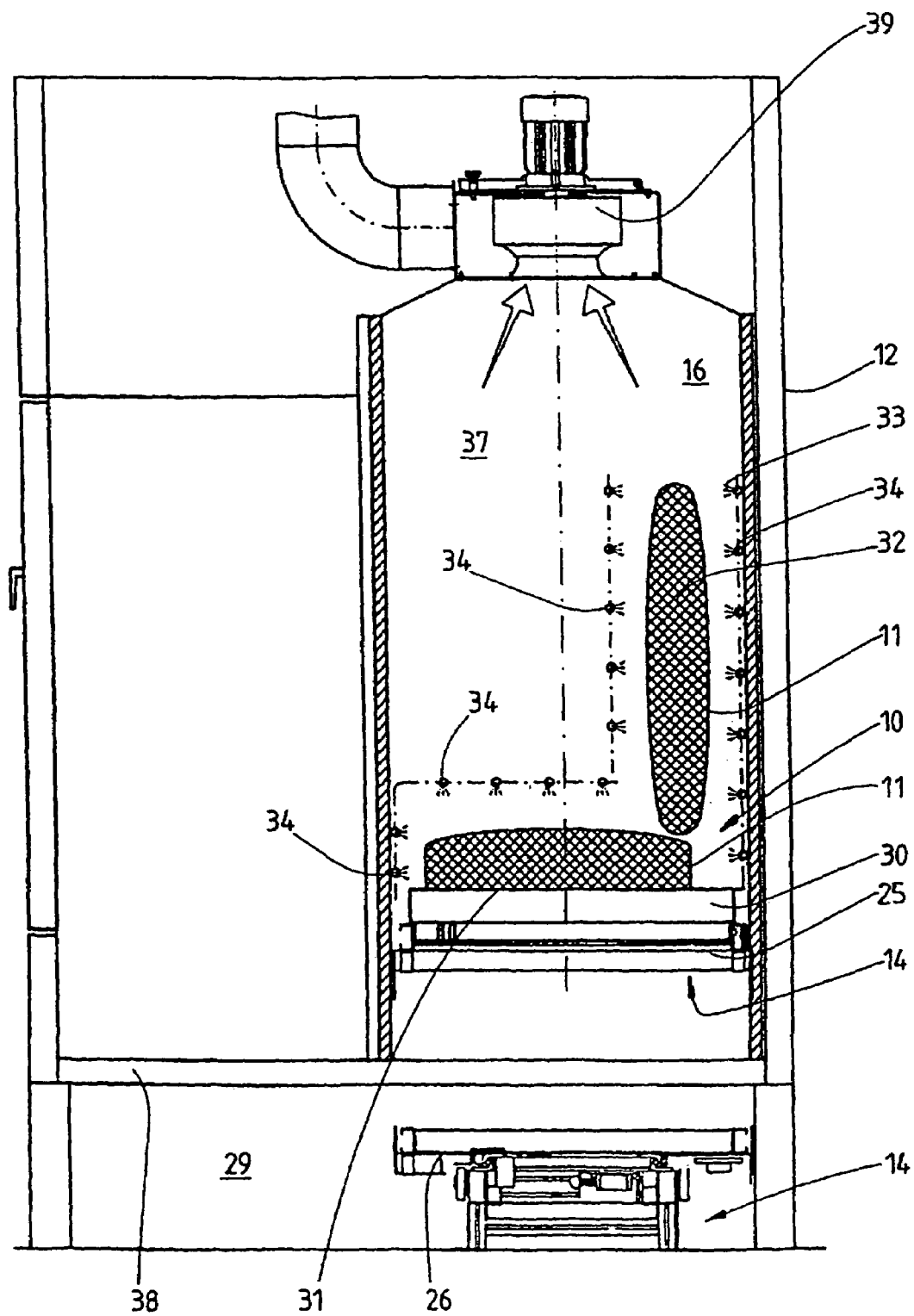
Figure 6:
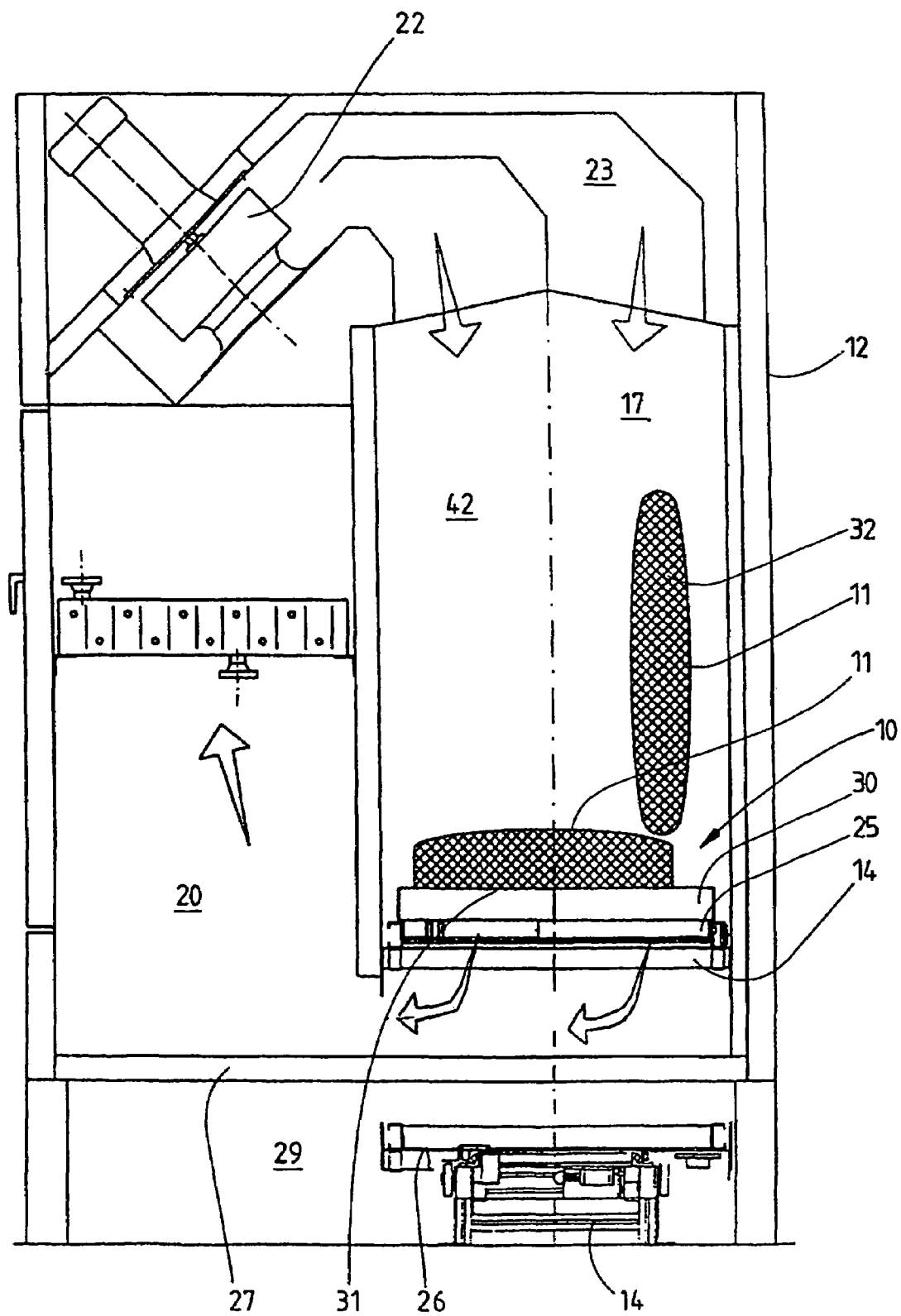

Two preferred exemplary embodiments of the device according to the invention and of the method will be explained in more detail below using the drawing, in which:

FIG. 1 shows a schematic outline illustration of a first exemplary embodiment of the device, FIG. 2 shows a cross section II-II through a first treatment chamber of the device, FIG. 3 shows a cross section III-III through a second treatment chamber of the device, FIG. 4 shows a schematic outline illustration of a device according to a second exemplary embodiment of the invention, FIG. 5 shows a cross section V-V through a first treatment chamber of the device of FIG. 4, and FIG. 6 shows a cross section VI-VI through a second treatment chamber of the device of FIGS. 4 and 5.

The device shown here is used for the automatic treatment of seats 10 for transport vehicles, for example passenger cars, goods vehicles, railroad vehicles, aircraft or the like. In the device, designated a tunnel finisher in the specialist jargon, covers 11 of seats 10 are smoothed by machine, using steam and possibly additionally air, and subjected to a final finishing treatment as a result.

The device has a box-like housing 12, which is of substantially airtight construction. The seats 10 to be treated are transported through the device by a conveyor 14 in the treatment direction 13, specifically in a straight line in the exemplary embodiment shown, in the substantially finished state.

The device shown here by way of example has an inlet airlock 15, a first treatment chamber 16, a second treatment chamber 17 and an outlet airlock 18, which are arranged to follow one another in the order mentioned above in the treatment direction 13. Side chambers 19 and 20 are arranged beside the first treatment chamber 16 and the second treatment chamber 17 in the device shown in FIGS. 1 to 3.

In the exemplary embodiment shown, above the first treatment chamber 16 and the side chamber 19 arranged beside it, there is a ventilation chamber 21, in which two fans 22, operated by electric motors here, are arranged. Likewise, above the second treatment chamber 17 and the side chamber 20 beside it, there is a ventilation chamber 23 again having two fans 24.

The conveyor 14 is constructed as a continuous conveyor. In this case, it can be a conveyor 14 of conventional design, for example a chain conveyor or a friction roller conveyor. The conveyor extends through the entire device in a straight line in the treatment direction 13. Part of the conveying section of the conveyor 14 is located outside the housing 12 of the device, specifically both in front of the device and behind it. The conveyor 14 is constructed as an endless conveyor. An upper run 25 of the conveyor 14 runs partly through the inlet airlock 15, the first treatment chamber 16, the second treatment chamber 17 and the outlet airlock 18. A lower run 26 of the conveyor 14 runs at a distance underneath the upper run 25, specifically in an interspace 29 separated by an intermediate floor 27 from the treatment chambers 16 and 17 and the inlet airlock 15 and also the outlet airlock 18.

Arranged on the conveyor 14 are individual seat carriers 30. The respective seat carrier 30 is preferably designed to accommodate a single seat 10. In each case a seat 10 together with its frame 31, specifically a substructure of the frame 31, is detachably fastened to the seat carrier 30. For this purpose, fastening means on the lower part of the frame 31 of the seat 10 can be used, normally being used later to anchor the seat in the relevant transport vehicle. The seat carriers 30 can be connected permanently to the conveyor 14 but can also merely be located loosely on the conveyor. The seat carriers 30 can then be removed from the conveyor 14 and can be pre-assembled under the frame 31 of the respective seat 10, so that the seat 10 to be treated with the seat carrier 30 merely needs to be placed on the conveyor 14 and taken off following the treatment.

The seat carriers 30 connected firmly to the conveyor 14 follow one another at uniform distances. The loose seat carriers 30, on the other hand, can be placed on the conveyors 14 at any desired points, care merely having to be taken that there is a certain distance from the preceding seat carriers 30, in order that the seats 10 are accessible from all sides during the treatment.

The seats 10 are arranged on the seat carriers 30 so as to be aligned transversely with respect to the treatment direction 13 (FIG. 2). The seats 10 are therefore not moved through the device in the same way as in the transport vehicle but in a state rotated through 90° with respect to a vertical axis. The area of the backrests 32 of the seat 10 then runs parallel to the treatment direction 13 and, at the same time, is located off-center in the treatment chambers 16 and 17.

In the first treatment chamber 16, the seats 10 to be treated are treated with steam. For this purpose, a plurality of steam nozzles 33 are arranged in the first treatment chamber 16. The steam nozzles 33, which are preferably of the same design, are matched to the course of the profile of the transversely aligned seat 10. To this end, the steam nozzles 33 are positioned in the first treatment chamber 16 such that, with substantially uniform distances from the areas of the seat 10, they surround the latter for the most part with the exception of an upper edge of the backrest 32. The steam nozzles 33 are arranged on steam pipes 34 running parallel to the treatment direction 13. Each of the steam pipes 34 is arranged in a fixed location in the first treatment chamber 16. Furthermore, each steam pipe 34 has a plurality of steam nozzles 33 which follow one another at uniform intervals and are aligned at right angles to the areas of the seat 10 assigned to them (FIG. 2). The distances of the steam nozzles 33 on the respective steam pipe 34 and the distances of the steam pipes 34 are dimensioned such that there are approximately equal distances in all directions between adjacent steam nozzles 33, so that the steam nozzles 33 apply steam uniformly to the areas of the seat 10.

In the exemplary embodiment shown, further steam pipes 35 with a row of steam nozzles 33 are arranged in the upper region of the first treatment chamber 16, underneath the ventilation chamber 21. Said steam pipes supply steam to the treatment chamber 16 from above.

In the device of FIGS. 1 to 3, heated air or hot air is led into the first treatment chamber 16 from above. The hot air is led into the first treatment chamber 16 from above through the ventilation chamber 21 by the fans 22. The hot air has a temperature which is higher than the temperature of the steam. The hot air is used to distribute the steam in the first treatment chamber 16 and to discharge cooled steam. This cooled steam, together with the likewise cooled air, is led to the underside of the first treatment chamber 16. Accordingly, the hot air flows from top to bottom through the first treatment chamber 16. The air collects with the steam underneath the seat 10 and the upper run 25 of the conveyor 14. Through an overflow channel 36 above the intermediate floor 27 of the first treatment chamber 16, the air passes from the first treatment chamber 16 into the side chamber 19 arranged beside the latter. Here, the air is led away, specifically preferably to the environment. Filtering or other conditioning of the air can be carried out before this. It is also conceivable to supply the air from the side chamber 19 directly to the ventilation chamber 21 via the first treatment chamber 16 again, if appropriate following conditioning, specifically filtering and/or drying. The overflow channel 36 in the floor region of the first treatment chamber 16 is formed by a vertical dividing wall 37 running parallel to the treatment direction 13 between the first treatment chamber 16 and the side chamber 19, the dividing wall 37 ending above the intermediate floor 27 of the first treatment chamber 16 and the side chamber 19.

In the second treatment chamber 17, the seats 10 treated with steam and possibly with hot air in the first treatment chamber 16 are dried. The second treatment chamber 17 is constructed in the same way as the first treatment chamber 16. Only the steam pipes 34 and 35 for supplying steam to the seats 10 are missing. In the second treatment chamber 17, heated dry air is led past the seats 10 in the vertical flow direction. The air is blown in by the fans 24 through the ventilation chamber 23 into the second treatment chamber 17 from above. After the air has flowed past the seats 10, it is discharged into the side chamber 20 underneath the seats and the conveyor 14. To this end, the air flows along the intermediate floor 27, through the overflow channel 36 under the dividing wall 37 into the side chamber 20. From here, after conditioning has possibly been carried out, in particular filtering and drying, the air is either led out of the housing 12 or led into the ventilation chamber 23 again.

It is alternatively conceivable, both in the first treatment chamber 16 and in the second treatment chamber 17, to lead the air laterally into the side chamber 19 or 20 underneath the cover 11 of the seat 10 but still above the conveyor 14 and preferably also the seat carrier 30, through an appropriate opening in the dividing wall 37. In this case, the air enriched with moisture for the most part does not come into contact with the conveyor 14 and the seat carriers 30, so that no moisture from the air can condense on these.

The device shown in FIGS. 4 to 6 differs from the device described previously in that there is no side chamber 19 beside the first treatment chamber 16. Accordingly, the first treatment chamber 16 is completely closed at the sides, to be specific in particular above a bottom wall 38. In addition, only steam pipes 34 which follow the contour of the seat 10 are provided. In this exemplary embodiment of the device, the seats 10 are treated only with steam, and therefore no additional heated air is supplied to the first treatment chamber 16.

In the case of the device shown here, at least one suction blower 39 is arranged above the first treatment chamber 16. This sucks air out of the first treatment chamber 16, so that a vacuum is produced in the latter which sucks the steam flowing in via the steam nozzles 33 of the steam pipes 34 continuously out of the first treatment chamber 16 and leads it out of the device.

Otherwise, the device corresponding to FIGS. 4 to 6 corresponds to the device described in FIGS. 1 to 3, to which reference is made. Accordingly, identical parts are provided with identical reference numbers.

The two devices described above have a vertical dividing wall 40 running transversely with respect to the treatment direction 13 between the first treatment chamber 16 and the second treatment chamber 17. This dividing wall is provided with a passage opening, not shown in the figures, of which the contour is matched to the cross section of the seat 10, by, for example, having a profile which corresponds to the arrangement of the steam pipes 34 (FIGS. 2 and 5).

The two devices comprising the identically constructed inlet airlock 15 and outlet airlock 18 are formed by a chamber before the first treatment chamber 16 and a chamber after the second treatment chamber 17.

The inlet airlock 15 has two parallel, vertical walls, which are oriented transversely with respect to the treatment direction 13. An outer wall 41, which at the same time forms part of the wall of the housing 12, and an inner wall 42 running parallel thereto between the inlet airlock 15 and the first treatment chamber 16 equally have an inlet opening, not shown in the figures. The inlet opening is formed like the opening in the dividing wall 40, namely matched to the cross-sectional contour of the seat 10, and also preferably somewhat larger, so that various seats can be treated in the device. The outer contour of the openings can correspond to an (imaginary) envelope curve, on which the steam pipes 34 are arranged. It is conceivable to close the openings of at least one wall, for example the outer wall 41, additionally with a flexible curtain.

Above the inlet airlock 15, namely in the ceiling region of the same, a suction blower 39 is arranged. This produces a vacuum in the inlet airlock 15. The air stream which is produced as a result and is oriented vertically upward forms an air curtain to close the openings, in particular in the wall 42 of the inlet airlock 15 belonging to the first treatment chamber 16.

In the exemplary embodiment shown, the outlet airlock 18 is constructed in the same way as the inlet airlock 15 and has a same function.

The method according to the invention will be explained below, it being assumed initially that the conveyor 14 is driven continuously and the seat carriers 30 are arranged on the conveyor 14 such that they can be removed:

A finished upholstered seat 10 with the frame 31 and, in particular, also the substructure of the frame 31, is mounted on a seat carrier 30 in front of the device, outside the region of the conveyor 14. This is done while the conveyor 14 is driven continuously. In the process, seat carriers 30 already arranged on the upper run 25 of the conveyor 14 and with seats 10 fastened to them are transported continuously in the treatment direction 13 through the first treatment chamber 16 and the second treatment chamber 17 of the device (tunnel finisher). The treatment chambers 16 and 17 have a length in the treatment direction 13 which is sufficient to finish the seat 10 and then to dry it during the continuous transport of the respective seat 10 through the treatment chambers 16 and 17. Depending on the length of the treatment chambers 16 and 17, a plurality of seats 10 following one another at a distance can be located therein at the same time; but also only a single seat 10. It is also conceivable to construct the first treatment chamber 16 to be longer than the second treatment chamber 17 following it.

The finished assembled seats 10 are transported through the first treatment chamber 16 aligned transversely with respect to the treatment direction 13 and, in the process, are acted on both with steam and with heated air, in particular heated recirculated air, in the device of FIGS. 1 to 3. The temperature of the air or recirculated air is preferably higher than the temperature of the steam. In particular, applying steam to the cover 11 of the seats 10 leads to the cover 11 being smoothed.

Cooled steam and cooled air are led along under the seats 10 on the bottom wall 38 of the first treatment chamber 16 to the side chamber 19 arranged beside the first treatment chamber 16 and extracted here, specifically after reconditioning of the air, to be specific in particular filtering and/or dehumidifying the same, has been carried out, if appropriate.

Following treatment with steam and heated air, in each case a seat 10 finished in this way leaves the first treatment chamber 16 and is transported by the conveyor 14 into the following, second treatment chamber 17, specifically through a passage opening, designed to fit the seat 10, in the dividing wall 40 between the two treatment chambers 16 and 17. In the second treatment chamber 17, drying of the respective entire seat 10 is carried out, specifically also the frame 31 and, if appropriate, the seat carrier 30. This drying is carried out with heated drying air, which flows vertically through the treatment chamber 17 and, in the region of the intermediate floor 27 of the second treatment chamber 17, is led into the side chamber 20 located alongside the latter where, if appropriate following conditioning (filtering and/or dehumidifying), the air is led out of the device or supplied to the second treatment chamber 17 again in circulation.

After drying, the respective seat 10 is transported by the conveyor 14 out of the tunnel finisher, where the treated seat 10 with the seat carrier 30 is removed from the upper run 25 of the conveyor 14. The seat carrier 30 is then separated from the seat 10. The seat carrier 30 is then transported back again to the front side of the tunnel finisher, which, if appropriate, can be carried out by the lower run 26 of the conveyor 14, by the empty seat carrier 30 being placed on the lower run 26 of the conveyor 14 for this purpose.

Before the respective seat 10 is conveyed into the tunnel finisher, specifically the first treatment chamber 16, it passes through the inlet airlock 15, which is arranged in front of the first treatment chamber 16 in the treatment direction 13. The inlet airlock 15 prevents, at least for the most part, the entry of external air into the first treatment chamber 16 and the emergence of steam and, if appropriate, warm air from the first treatment chamber 16 to the environment. To the same extent, when a seat 10 is transported out of the tunnel finisher, the outlet airlock 18 prevents air exchange between the environment and the second treatment chamber 17.

The method according to the invention with the tunnel finisher shown in FIGS. 4 to 6 proceeds in the same way as the method described above, except that, in the first treatment chamber 16, the respective seat 10 and the cover 11 are treated only with steam. Accordingly, treatment is carried out here without additional heated air or recirculated air.

As an alternative to the methods described above, it is possible to transport the seats 10 discontinuously through the tunnel finisher by means of the conveyor 14. The treatment of the seats 10 both in the first treatment chamber 16 and in the second treatment chamber 17 is then carried out with the conveyor 14 at a standstill. The seats 10 are then finished in the instantaneously stationary, resting state and likewise subsequently dried.

During the standstill phases of the conveyor 14 for finishing and drying the seats 10, loading of the conveyor 14 with a seat 10 still to be treated is carried out before the tunnel finisher. During the same time, a treated seat 10 is removed from the conveyor 14 after the tunnel finisher. In this method, it is conceivable to use seat carriers 30 which are permanently connected to the conveyor 14. A seat 10 to be treated in each case is then momentarily fastened to the seat carrier 30 located on the conveyor 14 before the tunnel finisher. After the tunnel finisher, with the conveyor 14 at a standstill, the finished seat 10 is then released from the seat carrier 30 again, the seat carrier 30 remaining on the conveyor 14. Transporting empty seat carriers 30 back to the start of the tunnel finisher then takes place along the lower run 26 of the conveyor 14.

LIST OF REFERENCE NUMBERS

10 Seat
11 Cover
12 Housing
13 Treatment direction
14 Conveyor
15 Inlet airlock
16 First treatment chamber
17 Second treatment chamber
18 Outlet airlock
19 Side chamber
20 Side chamber
21 Ventilation chamber
22 Fan
23 Ventilation chamber
24 Fan
25 Upper run
26 Lower run
27 Intermediate floor
29 Interspace
30 Seat carrier
31 Frame
32 Backrest
33 Steam nozzle
34 Steam pipe
35 Steam pipe
36 Overflow channel
37 Dividing wall
38 Bottom wall
39 Suction blower
40 Dividing wall
41 Wall
42 Wall

The invention claimed is:

1. A method of treating seat covers for vehicles, comprising:
   drawing each seat cover onto a frame; and
   treating the seat covers with steam and heated air in at least one treatment chamber;
   wherein the seat covers and frames are dried in at least one treatment chamber following the treatment chamber used for the steam and air treatment; and
   wherein the drying of the seat covers and frames is carried out in the same treatment chamber in which the treatment with steam and air is also carried out.

2. The method as claimed in claim 1 wherein the seat covers and frames are transported continuously through the at least one treatment chamber oriented transversely.

3. The method as claimed in claim 1 wherein the seat covers and frames are transported continuously by means of a conveyor, through the treatment chamber used for the steam treatment and the treatment chamber used for the drying.

4. The method as claimed in claim 1 wherein the seat covers and frames are transported by a conveyor and the steam and the air is discharged from the at least one treatment chamber above the conveyor.

5. The method of claim 1 wherein the steam is discharged from the at least one treatment chamber above the seat covers and frames.

6. The method of claim 1, wherein the heated air is recirculated heated air.

7. The method of claim 1 wherein the heated air is at a higher temperature than the steam.

8. A device for treating seats having seat covers for vehicles, including at least one treatment chamber, to which steam and/or air can be supplied, and a conveyor, the conveyor extending through the at least one treatment chamber;
   wherein the at least one treatment chamber includes steam nozzles arranged to follow the course of the profile of the seats;
   wherein each seat includes a frame and can be transported through the at least one treatment chamber by the conveyor, and
   wherein the conveyor includes seat carriers on which the seats with their frames are arranged, detachably fastened, at least as they are transported through the at least one treatment chamber.

9. The device as claimed in claim 8 wherein the seat carriers are assigned to the conveyor so as to follow one another at a distance.

10. The device as claimed in claim 8 wherein two successive treatment chambers are provided, the treatment chambers being separated from one another by at least one dividing wall having a passage opening for a seat.

11. The device as claimed in claim 8 wherein the at least one treatment chamber includes a first treatment chamber adapted to treat at least the seat covers of the seats with steam and with warm air.

12. The device as claimed in claim 11 wherein the at least one treatment chamber further includes a second treatment chamber, following the first treatment chamber adapted to dry the seat covers.

13. A device for treating seats having seat covers for vehicles, including at least one treatment chamber, to which steam and/or air can be supplied, and a conveyor, the conveyor extending through the at least one treatment chamber;
   wherein the at least one treatment chamber includes steam nozzles arranged to follow the course of the profile of the seats; and
   wherein the at least one treatment chamber includes first and second treatment chambers having inlet and outlet airlock openings, the inlet airlock preferably being arranged at the start of the first treatment chamber and the outlet airlock being arranged at the end of the second treatment chamber.

14. The device as claimed in claim 13 wherein in the region of the inlet airlock and/or the outlet airlock, the relevant wall of the respective treatment chamber is of double-walled design to form an airlock chamber, to which vacuum can be applied.

* * * * *